United States Patent
Zee et al.

(10) Patent No.: US 6,188,331 B1
(45) Date of Patent: Feb. 13, 2001

(54) TACTILE SENSOR AND METHOD FOR DETERMINING A SHEAR FORCE AND SLIP WITH SUCH A TACTILE SENSOR

(75) Inventors: Fulco Zee, Leiden; Eduwardus Gerardus Maria Holweg, Delft; Paulus Petrus Leonardus Regtien, Hengelo; Willem Jongkind, Leimuiden, all of (NL)

(73) Assignee: Fokker Space BV (NL)

( * ) Notice: Under 35 U.S.C. 154(b), the term of this patent shall be extended for 0 days.

(21) Appl. No.: 09/171,354

(22) PCT Filed: Apr. 18, 1997

(86) PCT No.: PCT/NL97/00202

§ 371 Date: Feb. 26, 1999

§ 102(e) Date: Feb. 26, 1999

(87) PCT Pub. No.: WO97/40339

PCT Pub. Date: Oct. 30, 1997

(30) Foreign Application Priority Data

Apr. 19, 1996 (NL) .................................... 1002907

(51) Int. Cl.[7] .................................... H03M 11/00
(52) U.S. Cl. .................. 341/34; 33/123; 73/628; 73/652; 338/99
(58) Field of Search .................. 341/34, 32, 33; 73/628, 652, 862.43, 862.46, 862.541, 862.637; 33/123; 338/99, 114; 178/18.01

(56) References Cited

U.S. PATENT DOCUMENTS

| 4,208,648 | 6/1980 | Naumann | 338/99 |
| 4,483,076 | 11/1984 | Brooks | 33/123 |
| 5,553,500 | * 9/1996 | Grahn et al. | 73/628 |
| 5,604,314 | * 2/1997 | Grahn | 73/628 |

FOREIGN PATENT DOCUMENTS

| 0 595 532 | 5/1994 | (EP). |
| 0 658 753 | 6/1995 | (EP). |
| WO 96/13704 | 5/1996 | (WO). |

OTHER PUBLICATIONS

De Ingenieur, vol. 108, No. 5, Mar. 20, 1996, Netherlands, pp. 28–31, EP000614607, W. Jongkind: "Robothand krijgt mens".

Proceedings of the Instrument and Measurement Technology Conference, Orvine, CA., May 18–20, 1993, May 18, 1993, Institute of Electrical and Electronics Engineers, pp. 579–583, XP000400239, McMath W S et al: High Sampling Resolution Tactile Sensor For Object Recognition.

* cited by examiner

Primary Examiner—Michael Horabik
Assistant Examiner—Albert K. Wong
(74) Attorney, Agent, or Firm—Akerman Senterfitt

(57) ABSTRACT

The invention relates to a tactile sensor comprising a base plate provided at a first side with a plurality of electrically conducting wires forming a row, and provided at a second side opposite to the first side of the base plate with a plurality of electrically conducting wires forming a column, each of these wires forming cross points with the electrically conducting row wires. Each of the column wires forms an electrical contact with the row wires near each cross point, which electrical contacts are located at the first side of the base plate. The first side of the base plate is provided with a covering having a pressure-dependent electrical resistance and which, together with the electrical contact of the column wires and the row wires, is suitable to form one or more current paths. The covering is divided into segments, with each segment covering at least two adjacent cross points.

15 Claims, 1 Drawing Sheet

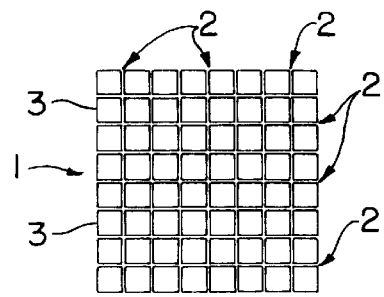
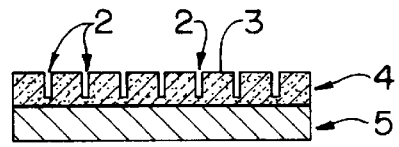
FIG. 1A    FIG. 1B
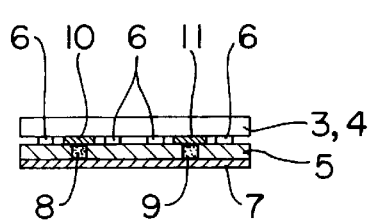
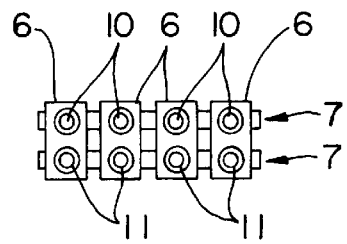
FIG. 2A    FIG. 2B
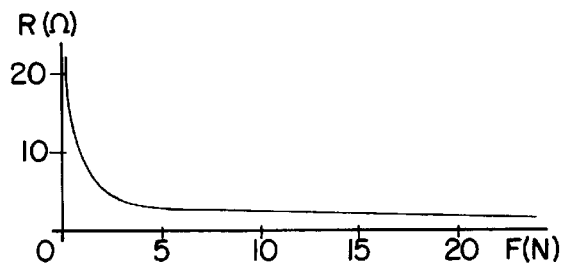
FIG. 3
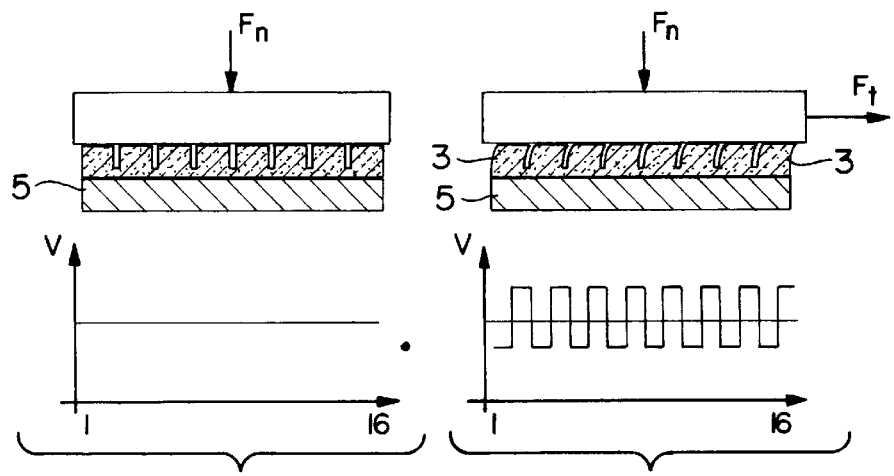
FIG. 4A    FIG. 4B

TACTILE SENSOR AND METHOD FOR DETERMINING A SHEAR FORCE AND SLIP WITH SUCH A TACTILE SENSOR

The invention relates to a tactile sensor comprising a base plate provided at a first side with a plurality of electrically conducting wires forming a row, and provided at a second side opposite to the first side of the base plate with a plurality of electrically conducting wires forming a column, each of these wires forming cross points with the electrically conducting row wires, wherein each of the column wires forms an electrical contact with the row wires near each cross point, which electrical contacts are located at the first side of the base plate, and the first side of the base plate is provided with a covering having a pressure-dependent electrical resistance and which, together with the electrical contacts of the column wires and the row wires, is suitable to form one or more current paths.

Such a tactile sensor is known from the journal "De Ingenieur", volume 108, No. 5, Mar. 20, 1996, pages 28–31. The base plate of the tactile sensor of the prior art is a so-called printed circuit board. Both sides of the print are provided with this printed circuit. The printed circuit consists of 16 equidistant strips of conductive material on a first side of the print and 16 equidistant strips of electrically conducting material on the other side of the print arranged orthogonally to the fist strips. At the cross points, a metal connection from the one side to the other side is provided for the strips on the first side only, but in such a manner that these electric interconnections form islands at the cross points within the strips of conductive material on the other side of the print. The latter side is also provided with a covering of an electrically conductive rubber which has a pressure-dependent electric resistance. By applying a load to the sensor on the side of the covering, it is possible to measure both the position and the force of the applied load.

It is the objective of the invention to improve this known sensor such that this sensor can also measure tangential or shear forces and to enable the sensor to measure the start and progression of slip more accurately and continuously.

To this end the tactile sensor according to the invention is characterized, in that the covering is divided into segments, each segment covering at least two adjacent cross points. This makes it possible to measure a difference in load ensuing from shear forces at adjacent cross points because, in contrast with the prior art, the segmentation now admits varying normal forces at these adjacent cross points.

The invention also embodies a method for the determination of a shear force when a load is applied on a tactile sensor as discussed above. According to the invention this method is characterized in that the resistance values of current paths formed between the connection points of each of the electrically conducting row wires and of each of the electrically conducting column wires is determined, that for each current path these resistance values are converted to numerical values which are a measure for the load at the cross points of the row and column wires, and that the difference between the numerical values of adjacent cross points is determined, as being a measure of the shear force exerted on the sensor.

If the tactile sensor is made such that each segment covers four adjacent cross points forming the corners of a square, it is possible to measure the shear forces occurring in the plane of the covering in any arbitrary orientation by resolving the measured forces in combining orthogonal directions determined by these four adjacent cross points.

A possible embodiment of the tactile sensor in accordance with the invention is one in which the covering is composed of separate segments which are not interconnected. However, a preferred embodiment of the tactile sensor according to the invention is provided with a covering comprising an undivided base surface resting on the first side of the base plate, while the base surface is provided with separate projections forming the segments. The manufacture of this tactile sensor is particularly simple. This covering can be particularly easily provided if it is formed from an electrically conducting rubber having a pressure-dependent electrical resistance, due to the fact that the rubber is incised crosswise, with the segments being located between the incisions.

As mentioned above, the tactile sensor according to the invention is particularly suitable for the measurement of shear forces. In addition, the invention provides a tactile sensor possessing an increased sensitivity for the determination of slip occurring while the tactile sensor is loaded. To this effect this sensor according to the invention is applied such that resistance values are determined of current paths formed between the connection points of each of the electrically conducting row wires and of each of the electrically conducting column wires, that these resistance values are converted for each current path to numerical values constituting a measure for the load at the cross points of the row and column wires, that these values are totalized to produce a principal value, and that from a series of these principal values a frequency spectrum is determined and the occurrence of predetermined frequency characteristics is detected as an indication of the slip.

The invention will now be further elucidated with reference to the drawing of a non-limiting embodiment. In the drawing FIG. 1a shows a top view of the tactile sensor according to the invention;

FIG. 1b shows a side view of the tactile sensor according to the invention;

FIG. 2a shows a cross-section of the tactile sensor according to the invention;

FIG. 2b shows a partial top view of the tactile sensor according to the invention;

FIG. 3 shows a resistance characteristic of the covering constituting part of the tactile sensor according to the invention;

FIG. 4a shows a measurement characteristic at normal load of the tactile sensor according to the invention; and FIG. 4b shows a measurement characteristic when the tactile sensor according to the invention is loaded with a shear force.

Identical parts in the Figures carry identical reference numbers.

FIG. 1a shows the top view of the tactile sensor 1, wherein this top side of the material of the covering is incised. The covering is preferably formed from an electrically conducting rubber with a pressure-dependent electrical resistance of which a possible characteristic is shown in FIG. 3. The incisions are applied crosswise, with the segments 3 located between the incisions. This is also clearly visible in FIG. 1b, showing also that the covering, which is generally indicated by reference number 4, is applied on a base plate 5.

As can be more clearly seen in FIG. 2a, the base plate 5 is at both sides provided with a printed circuit, namely on the first side a printed circuit 6 and on the second side opposite the first side of the base plate 5, a printed circuit 7. The circuit 7 has metallized borings 8 and 9 through the material of the base plate 5 to allow electric contacts 10 and 11 to be formed at the first side of the base plate. A partial top view in which the covering 4 is not represented, is shown in FIG. 2*b*, representing a schematic top view of a part of the sensor, omitting the covering 4. At the under side of the base plate 5, electrically conducting wires 7 are shown as well as the contacts 10 and 11 provided at the top side of the base plate 5, electrically connected with the wires 7. These contacts 10 and 11 are arranged like islands in the electrically conducting wires 6 provided at the top side of the base plate 5, and are oriented transversely in relation to the conducting wires 7 at the under side of the base plate 5. The electric contact between the contacts 10 and 11 which are connected with the conducting wires 7 and the conducting wires 6, is furnished by the covering 4. When this covering 4 is loaded, the electrical contact between the conducting wires 6 and the conducting wires 7 is enhanced and this is measured in order to determine the type and the load exerted on the tactile sensor 1.

As shown in FIG. 3, the resistance value R of the covering 4, which in this case is an electrically conducting rubber, decreases with increasing load. According to the invention the covering 4 is divided in segments 3, each segment covering at least two adjacent cross points. These cross points are the points where the electrical wires 7 and 6 cross. In the case shown in the present embodiment, these cross points coincide with the electrical contacts 10 and 11. In a preferred embodiment of the tactile sensor according to the invention, each segment 3 covers four adjacent cross points forming a square, so that the shear forces can be determined in two orthogonal directions.

FIGS. 4*a* and 4*b* show an example of a tactile sensor according to the invention in which a row of 16 equidistant electrically conducting wires are provided at the under side of the base plate 5 and placed transversely to it, a column of 16 equidistant electrically conducting wires on the top side of the base plate 5, in which arrangement there are 256 cross points arrayed in a matrix. FIG. 4*a* shows the measuring results from normal loading of the tactile sensor according to the invention as measured along the 16 current paths of which one component is conducting wire 7. On the abscissa the cross points, numbered 1 to 16, are indicated, each of which is a component of such a current path. FIG. 4*a* shows that when applying an evenly distributed normal force $F_n$ to the tactile sensor, an identical resistance value as plotted on the ordinate, is measured for each current path. If, as shown in FIG. 4*b*, apart from a normal force $F_n$ also a shear force $F_t$ is applied a measuring result as also shown in this Figure, will ensue. It has been shown that each twosome of adjacent cross points located under a segment 3 provides a different resistance value. These resistance values are for each current path converted to numerical values, providing a measure of the load at these cross points. The difference between the adjacent cross points under one segment 3 as described above, is then determined as measure for the shear force $F_t$ exerted on the sensor 1.

As already mentioned above, the tactile sensor according to the invention is also suitable for the determination of slip occurring while the sensor is loaded. To this effect resistance values are determined of current paths formed between the connection points of each of the electrically conducting row wires 6, and of each of the electrically conducting column wires 7, these resistance values are converted for each current path to numerical values constituting a measure for the load at the cross points of the row and column wires, these numerical values are totalized to produce a principal value, and from a series of these principal values a frequency spectrum is determined and the occurrence of predetermined frequency characteristics is detected as an indication of the slip.

What is claimed is:

1. A tactile sensor comprising: a base plate provided at a first side with a plurality of electrically conducting wires forming a row, and provided at a second side opposite to the first side of the base plate with a plurality of electrically conducting wires forming a column, each of the column wires extending through the base plate to form electrical contacts where connecting points are formed on the first side between the row wires and the electrical contacts, the first side of the base plate is provided with a covering having a pressure-dependent electrical resistance and which together with the electrical contacts of the column wires and the row wires forms one or more current paths, characterized in that the covering is divided into segments with each segment covering at least two adjacent connecting points and converting means for determining the resistances of the at least two adjacent connecting points.

2. A tactile sensor in accordance with claim 1, characterized in that each segment covers four adjacent cross points forming the corners of a square.

3. A tactile sensor in accordance with claim 1, characterized in that the covering comprises an undivided base surface resting on the first side of the base plate, while the base surface is provided with separate projections forming the segments.

4. A tactile sensor in accordance with claim 1, wherein the covering is formed from an electrically conducting rubber having a pressure-dependent electrical resistance, characterized in that the rubber is incised crosswise, with the segments being located between the incisions.

5. A method for the determination of a shear force when a load is applied on a tactile sensor in accordance with claim 1, characterized in that the resistance values of current paths formed between the connecting points of each of the electrically conductive row wires and of each of the electrically conductive column wires is determined, in that for each current path these resistance values are converted in numerical values which are a measure for the load at the cross points of the row and column wires, and that the difference between the numerical values of adjacent cross points is determined, as being a measure of the shear force exerted on the sensor.

6. A method for the determination of slip occurring while a tactile sensor in accordance with claim 1 is loaded, characterized in that resistance values are determined by current paths formed between the connecting points of each of the electrically conducting row wires and of each of the electrically conducting contact points of the column wires, that these resistance values are converted for each current path to numerical values constituting a measure for the load at the cross points of the row and column wires, that these values are totalized to produce a principal value, and that from a series of these principal values a frequency spectrum is determined and the occurrence of predetermined frequency characteristics is detected as an indication of the slip.

7. A tactile sensor in accordance with claim 2, characterized in that the covering comprises an undivided base surface resting on the first side of the base plate, while the base surface is provided with separate projections forming the segments.

8. A tactile sensor in accordance with claim 2, wherein the covering is formed from an electrically conducting rubber having a pressure-dependent electrical resistance, characterized in that the rubber is incised crosswise, with the segments being located between the incisions.

9. A tactile sensor in accordance with claim 3, wherein the covering is formed from an electrically conducting rubber having a pressure-dependent electrical resistance, characterized in that the rubber is incised crosswise, with the segments being located between the incisions.

10. A method for the determination of a shear force when a load is applied on a tactile sensor in accordance with claim 2, characterized in that the resistance values of current paths formed between the connecting points of each of the electrically conductive row wires and of each of the electrically conductive column wires is determined, in that for each current path these resistance values are converted in numerical values which are a measure for the load at the cross points of the row and column wires, and that the difference between the numerical values of adjacent cross points is determined, as being a measure of the shear force exerted on the sensor.

11. A method for the determination of a shear force when a load is applied on a tactile sensor in accordance with claim 3, characterized in that the resistance values of current paths formed between the connecting points of each of the electrically conductive row wires and of each of the electrically conductive column wires is determined, in that for each current path these resistance values are converted in numerical values which are a measure for the load at the cross points of the row and column wires, and that the difference between the numerical values of adjacent cross points is determined, as being a measure of the shear force exerted on the sensor.

12. A method for the determination of a shear force when a load is applied on a tactile sensor in accordance with claim 4, characterized in that the resistance values of current paths formed between the connecting points of each of the electrically conductive row wires and of each of the electrically conductive column wires is determined, in that for each current path these resistance values are converted in numerical values which are a measure for the load at the cross points of the row and column wires, and that the difference between the numerical values of adjacent cross points is determined, as being a measure of the shear force exerted on the sensor.

13. A method for the determination of slip occurring while a tactile sensor in accordance with claim 2 is loaded, characterized in that resistance values are determined of current paths formed between the connecting points of each of the electrically conducting row wires and of each of the electrically conducting column wires, that these resistance values are converted for each current path to numerical values constituting a measure for the load at the cross points of the row and column wires, that these values are totalized to produce a principal value, and that from a series of these principal values a frequency spectrum is determined and the occurrence of predetermined frequency characteristics is detected as a indication of the slip.

14. A method for the determination of slip occurring while a tactile sensor in accordance with claim 3 is loaded, characterized in that resistance values are determined of current paths formed between the connecting points of each of the electrically conducting row wires and of each of the electrically conducting column wires, that these resistance values are converted for each current path to numerical values constituting a measure for the load at the cross points of the row and column wires, that these values are totalized to produce a principal value, and that from a series of these principal values a frequency spectrum is determined and the occurrence of predetermined frequency characteristics is detected as a indication of the slip.

15. A method for the determination of slip occurring while a tactile sensor in accordance with claim 4 is loaded, characterized in that resistance values are determined of current paths formed between the connecting points of each of the electrically conducting row wires and of each of the electrically conducting column wires, that these resistance values are converted for each current path to numerical values constituting a measure for the load at the cross points of the row and column wires, that these values are totalized to produce a principal value, and that from a series of these principal values a frequency spectrum is determined and the occurrence of predetermined frequency characteristics is detected as a indication of the slip.

* * * * *